United States Patent
Kuniyoshi et al.

(10) Patent No.: US 9,765,745 B2
(45) Date of Patent: Sep. 19, 2017

(54) ENGINE START-UP DEVICE, AND ENGINE-START-UP CONTROL METHOD

(71) Applicant: Hitachi Automotive Systems, Ltd., Hitachinaka-shi, Ibaraki (JP)

(72) Inventors: Hiroyasu Kuniyoshi, Tokyo (JP); Shigehiko Omata, Hitachinaka (JP); Yoshiaki Nagasawa, Hitachinaka (JP); Masanori Watanabe, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 97 days.

(21) Appl. No.: 14/897,853

(22) PCT Filed: May 16, 2014

(86) PCT No.: PCT/JP2014/063009
§ 371 (c)(1),
(2) Date: Dec. 11, 2015

(87) PCT Pub. No.: WO2014/199772
PCT Pub. Date: Dec. 18, 2014

(65) Prior Publication Data
US 2016/0138549 A1    May 19, 2016

(30) Foreign Application Priority Data

Jun. 14, 2013 (JP) .................... 2013-125867

(51) Int. Cl.
*F02N 11/00* (2006.01)
*H02P 9/04* (2006.01)
(Continued)

(52) U.S. Cl.
CPC ............ *F02N 11/0862* (2013.01); *H02P 1/04* (2013.01); *F02N 11/087* (2013.01);
(Continued)

(58) Field of Classification Search
USPC .............. 290/38 R; 123/179.3; 701/112
See application file for complete search history.

(56) References Cited

U.S. PATENT DOCUMENTS 5,883,484 A * 3/1999 Akao ............... B60L 11/1807
                                                          318/139
6,751,105 B2 * 6/2004 Yamanaka ............ H02M 7/483
                                                          318/801
(Continued)

FOREIGN PATENT DOCUMENTS

CN        101078380 A    11/2007
JP        2004-308645 A  11/2004
(Continued)

OTHER PUBLICATIONS

International Search Report (PCT/ISA/210) issued in PCT Application No. PCT/JP2014/063009 dated Jul. 8, 2014, with English translation (four (4) pages).

*Primary Examiner* — Pedro J Cuevas
(74) *Attorney, Agent, or Firm* — Crowell & Moring LLP

(57) ABSTRACT

The purpose of the present invention is to swiftly start up an engine in a range in which electrical equipment having electric power supplied thereto by a battery is not reset, even in cases when the battery is insufficiently charged and the battery is deteriorated. An engine start-up device according to the present invention starts up an engine by transmitting, to the engine, the rotary force of a direct-current motor driven by a battery. The engine start-up device is provided with: a battery-voltage acquisition unit for acquiring the battery voltage of the battery; a target-current-value calculation unit which calculates, on the basis of the battery voltage acquired by the battery-voltage acquisition unit, a target current value for a motor current to be supplied from the battery to the direct-current motor; and a motor-current control unit for controlling a switching element which is
(Continued)

connected to the direct-current motor, and through which the motor current flows, such that the motor-current value of the motor current approaches the target current value.

9 Claims, 8 Drawing Sheets

(51) Int. Cl.
*F02N 11/08* (2006.01)
*H02P 1/04* (2006.01)
*F02N 15/02* (2006.01)
*F02N 15/06* (2006.01)

(52) U.S. Cl.
CPC ............ *F02N 11/0814* (2013.01); *F02N 15/02* (2013.01); *F02N 15/067* (2013.01); *F02N 2011/0888* (2013.01); *F02N 2200/041* (2013.01); *F02N 2200/063* (2013.01); *F02N 2250/02* (2013.01); *F02N 2300/106* (2013.01)

(56) References Cited

U.S. PATENT DOCUMENTS

| | | | | |
|---|---|---|---|---|
| 7,781,999 B2* | 8/2010 | Amano | ............... | B60L 11/14 307/9.1 |
| 7,952,309 B2* | 5/2011 | Nishimura | ......... | B60L 11/1803 318/400.14 |
| 8,188,695 B2* | 5/2012 | Chen | ............... | B60K 6/365 318/400.33 |
| 8,467,938 B2* | 6/2013 | Oya | ............... | B62D 5/0457 180/446 |
| 8,688,359 B2* | 4/2014 | Kuniyoshi | ......... | F02N 11/0855 123/179.25 |
| 8,816,618 B2* | 8/2014 | Fujii | ............... | H02P 21/0003 318/400.01 |
| 8,994,299 B2* | 3/2015 | Kokubun | ......... | F02N 11/087 318/139 |
| 9,178,454 B2* | 11/2015 | Miyachi | ............... | H02P 6/16 |
| 9,297,347 B2* | 3/2016 | Kokubun | ......... | F02N 11/087 |
| 9,422,904 B2* | 8/2016 | Omata | ............... | F02N 11/0855 |
| 2004/0168664 A1 | 9/2004 | Senda et al. | | |
| 2007/0272186 A1 | 11/2007 | Fukushima et al. | | |
| 2009/0115362 A1* | 5/2009 | Saha | ............... | B60L 11/123 318/400.09 |
| 2009/0195197 A1* | 8/2009 | Nishimura | ......... | B60L 11/1803 318/400.09 |
| 2010/0156333 A1* | 6/2010 | Chen | ............... | H02P 21/18 318/400.33 |
| 2011/0098889 A1* | 4/2011 | Oya | ............... | B62D 5/0457 701/41 |
| 2011/0270512 A1* | 11/2011 | Hayashi | ......... | F02N 11/0844 701/112 |
| 2012/0035827 A1* | 2/2012 | Kuniyoshi | ......... | F02N 11/0855 701/102 |
| 2012/0275078 A1* | 11/2012 | Kokubun | ......... | F02N 11/087 361/160 |
| 2012/0318227 A1* | 12/2012 | Hashimoto | ......... | F02N 11/0855 123/179.3 |
| 2013/0063061 A1* | 3/2013 | Hanada | ............... | H02P 27/08 318/400.14 |
| 2013/0268181 A1* | 10/2013 | Nagasawa | ......... | F02N 11/0814 701/112 |
| 2014/0053684 A1* | 2/2014 | Omata | ............... | F02N 11/0855 74/7 E |
| 2014/0159622 A1* | 6/2014 | Morii | ............... | H02P 21/0085 318/400.3 |
| 2015/0167618 A1* | 6/2015 | Kokubun | ......... | F02N 11/087 290/38 C |
| 2015/0256110 A1* | 9/2015 | Aoyama | ............... | H02P 6/28 318/400.15 |

FOREIGN PATENT DOCUMENTS

| | | |
|---|---|---|
| JP | 2005-188451 A | 7/2005 |
| JP | 2010-106825 A | 5/2010 |
| WO | WO 2013/080746 A1 | 6/2013 |

* cited by examiner

ENGINE START-UP DEVICE, AND ENGINE-START-UP CONTROL METHOD

TECHNICAL FIELD

The present, invention relates to an engine start-up device of a vehicle and an engine-start-up control method.

BACKGROUND ART

An engine automatic stop and start-up control device that, satisfies a demand for cost reduction and improves re-startability of an engine, has been disclosed (for example, refer to PTL 1). In the engine automatic stop and start-up control device, a switching element and a mechanical relay for a motor, that turn electrification on/off to a starter motor, are disposed in parallel so that a relative large current is not required to be electrified to the starter motor. In a case where engine stop position control is performed, the switching element precisely controls an electrification current of the motor.

CITATION LIST

Patent Literature

PTL 1: JP 2010-106825 A

SUMMARY OF INVENTION

Technical Problem

In the engine automatic stop and start-up control device disclosed in PTL 1, in a case where a battery has been insufficiently charged or in a case where the battery has degraded, electrical equipment to which the battery supplies electric power may be reset.

Solution to Problem (1) An engine start-up device according to claim 1, is an engine start-up device that starts up an engine by transmitting rotary force of a direct-current motor driven by a battery to the engine. The engine start-device includes: a battery-voltage acquisition unit that acquires a battery voltage of the battery; a target-current-value calculation unit that calculates a target current value of a motor current to be supplied from the battery to the direct-current motor based on the battery voltage acquired by the battery-voltage acquisition unit; and a motor-current control unit that controls a circuit element that has been coupled to the direct-current motor and through which the motor current flows so as to cause a motor-current, value of the motor current to come close to the target current value.

(2) An engine-start-up control method according to claim 8, is an engine-start-up control method for controlling an engine start-up that starts up an engine by transmitting rotary-force of a direct-current motor driven by a battery to the engine. The engine-start-up control method includes: acquiring a battery voltage of the battery; calculating a target current value of a motor current to be supplied from the battery to the direct-current motor based on the battery voltage; and controlling a circuit element that has been coupled to the direct-current motor and through which the motor current flows so as to cause a motor-current value of the motor current to come close to the target current value.

Advantageous Effects of Invention

According to the present invention, even in a case where a battery has been insufficiently charged and in a case where the battery has degraded, an engine can swiftly start up in a range in which electrical equipment to which the battery supplies electric power is not reset.

DESCRIPTION OF EMBODIMENT

Figure 1:
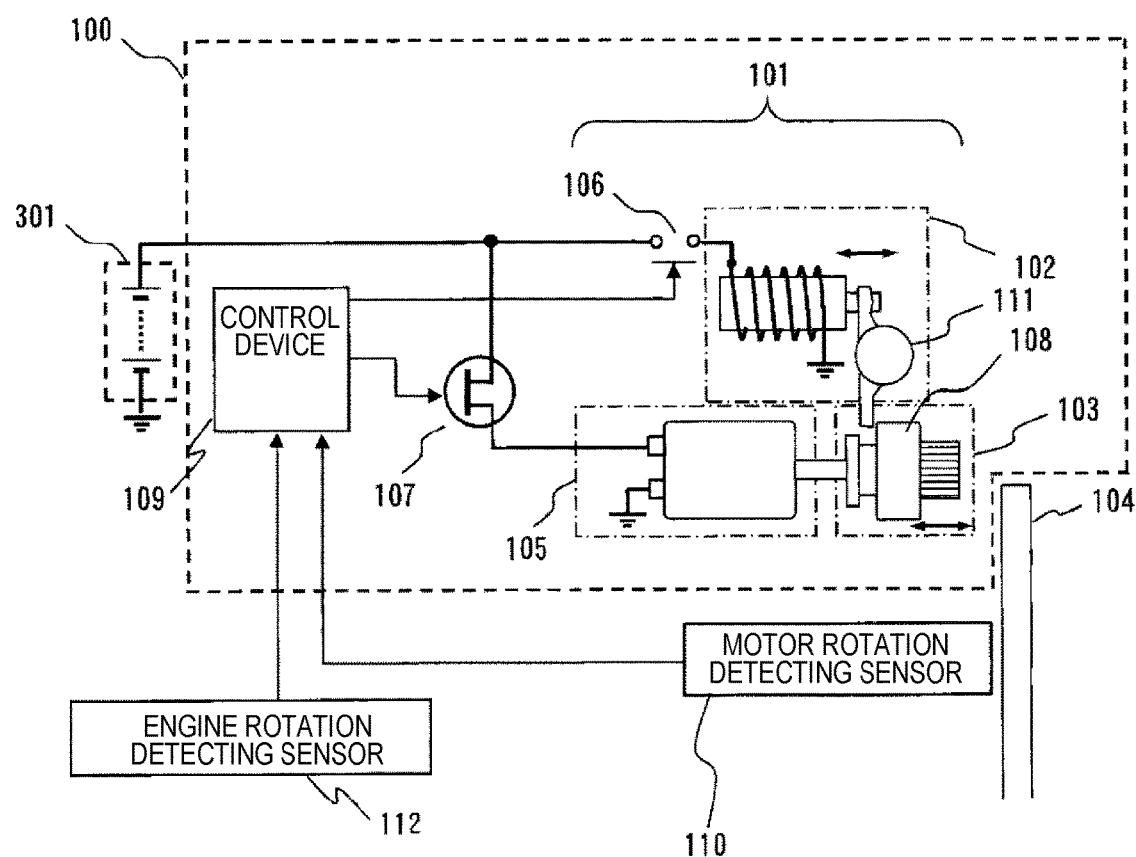
FIG. 1 is a block diagram of an engine start-up device of a vehicle and related devices according to one embodiment of the present invention.

For saving of energy resources and environment conservation, recent motor vehicles are equipped with an idling stop system for temporarily stopping an engine when a predetermined condition is satisfied during driving. For example, the idling stop system automatically stops an engine when a driver stops a vehicle for waiting for a traffic light to change. After that, the engine automatically restarts up when a restart request of the driver occurs or when operation of the engine is required. The so-called pinion extrusion type starter motor extrudes a pinion. The pinion engages with a ring gear directly coupled to an engine shaft so that the engine restarts up due to cranking of the starter motor.

It has been known that, upon a start-up of the engine, a current flows through a battery due to electrification to the starter motor and a voltage decreases in response to the current due to a characteristic of the battery. In the idling stop system that often stops and restarts up an engine during driving, when a voltage decreases, for example, electrical equipment such as a car navigation system may be reset. Accordingly, for example, an auxiliary power supply copes with vehicles that are equipped with the idling stop system in the related art. However, this results in degradation of mountability and an increase in cost.

In the related art, as an engine start-up device that starts up an engine of a vehicle using a direct-current motor, it has been known an engine start-up device that adds a resistance to a circuit so as to reduce an inrush current, inhibits a battery voltage drop at the beginning of an engine start-up, then short-circuits the resistance so that a current flows, and secures cranking torque.

As another example, it has been known an engine start-up device that controls electrification to a motor by a switching element at the beginning of an engine start-up, and increases an applied voltage of the motor by gradually increasing a duty ratio by PWM control so as to prevent a battery voltage drop immediately after the electrification starts.

However, in the engine start-up devices in the related art, since a battery current is controlled so as to decrease with time, output torque of a starter motor decreases and cranking of the engine is insufficiently performed. Therefore, there is a risk that the engine restart-up takes time. In a case where the battery has been insufficiently charged or a case where the battery has degraded, an actual battery voltage falls below an allowable battery voltage. Therefore, the electrical equipment may be reset.

An engine start-up device and an engine-start-up control method according to the present invention can swiftly restart up an engine at the maximum in an allowable range of a battery voltage drop, and can also cause an battery voltage effect to be in the allowable range even when a state of the battery varies. The engine start-up device and the engine-start-up control method according to the present invention are preferable, in particular, when an idling stop system restarts up an engine. The engine start-up device and the engine-start-up control method according to one embodiment of the present invention and modifications thereof will be described, below using FIGS. 1 to 8.

FIG. 1 is a block diagram of the engine start-up device 100 of a vehicle and related devices according to the one embodiment of the present invention. The engine start-up device 100 includes a starter 101, a switch 106 for electrifying a magnet switch 102, a switching element 107 for electrifying a motor 105, and a control device 109. The starter 101 includes the magnet switch 102, a pinion gear 103, and the motor 105. The motor 105 is the so-called direct-current motor, and generates rotary driving force by adding a direct current voltage. If necessary, the magnet switch 102 pulls a lever 111 so that a one-way clutch 108 moves on a motor rotary shaft. Thus, the pinion gear 103 engages with a ring gear 104 directly coupled to an engine shaft. In a state where the pinion gear 103 and the ring gear 104 engage with each other, the motor 105 is electrified so that the motor 105 rotates. Rotary force of the motor 105 is transmitted to the ring gear 104 through the one-way clutch 108 so that an engine (not illustrated) rotates.

The control device 109 performs normal fuel injection control, ignition control, and pneumatic control (electronic control throttle), and also controls an idling stop based on various information such as a brake pedal state and vehicle speed.

A motor rotation detecting sensor 110 detects rotation of the motor 105. Information on a motor rotational frequency that has been detected is input into the control device 109. In addition to the direct detection of the rotation of the motor 105 by the motor rotation detecting sensor 110, a rotational frequency of the motor 105 may be indirectly detected by using engine rotation detected by an engine rotation detecting sensor 112.

The magnet switch 102 is controlled by the control device 109 through, the switch 106. The switch 106 is, for example, a mechanical relay switch. The control device 103 performs PWM control to the electrification to the motor 105 through the switching element 107. The switching element 107 is, for example, a switching element using a semiconductor such as a MQSFET.

Figure 2:
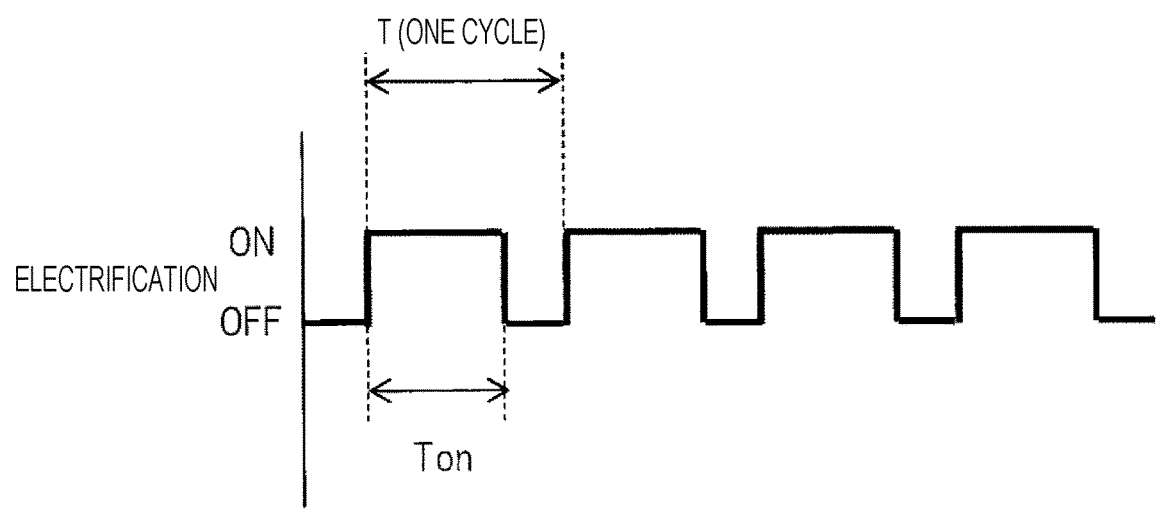
FIG. 2 is a graphical representation for describing an electrification signal of PWM control used for electrification control with respect to a motor included in the engine start-up device.

FIG. 2 is a graphical representation for describing an electrification signal of the PWM control used for electrification control with respect to the motor 105 included in the engine start-up device 100. The control device 109 outputs a PWM signal illustrated in FIG. 2 as the electrification signal. In accordance with the PWM signal, the switching element 107 controls to turn the electrification with respect to the motor 105 on/off.

In FIG. 2, a length T of one cycle of the PWM control is 0.1 ms in a case where, for example, a frequency of the PWM control is set to be 10 KHz. According to the present, embodiment, the frequency of the PWM control is determined so that the control is sufficiently faster than an electrical time constant of the motor.

An electrification rate D of the PWM control is defined as a rate of a section of the electrification in one cycle. The electrification rate D is represented as a ratio between the section $T_{on}$ [s] of the electrification to the motor and the length T [s] in one cycle by the following expression (1).

[Mathematical Formula 1]

$$D = \frac{T_{ON}}{T} \quad (1)$$

The electrification rate D is a variable that can changes a value between 0.0 and 1.0. The control device 109 changes the electrification rate D so as to control the amount of the electrification to the motor.

Figure 3:
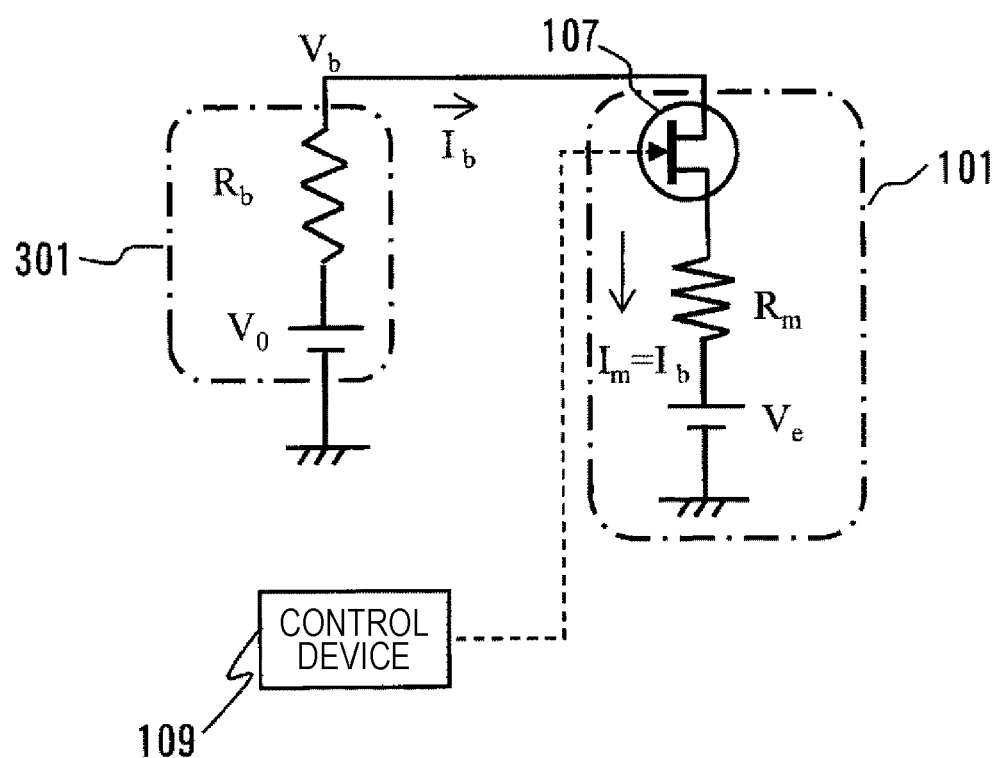
FIG. 3 is a simple circuit diagram illustrating a battery and a starter.

A characteristic of a battery 301 that supplies electric power for driving the engine start-up device 100 according to the present embodiment, will be described using FIG. 3. FIG. 3 is a simple circuit diagram illustrating the battery 301 and the starter 101. Various apparatuses are typically driven by a battery in motor vehicles. Here, only the battery 301 and the starter 101 including the motor 105 driven by the battery 301 are illustrated. A current (battery current) $I_b$ that flows through the battery 301 is equivalent to a motor current $I_m$ that flows through the motor 105. Assuming the battery 301 has an internal resistance $R_b$, based on the internal resistance $R_b$ [Ω] of the battery 301, an initial voltage (voltage when no current flows) $V_0$ [V] of the battery 301, and the battery current $I_b$ [A], an output voltage (battery voltage) $V_b$ [V] of the battery 301 is determined by the following expression 2.

[Mathematical Formula 2]

$$V_b = V_0 - I_b \times R_b \quad \text{[Mathematical Formula 2]}$$

As shown in Expression 2, since the battery voltage $V_b$ is determined by the battery current $I_b$, when the battery current $I_b$ can be controlled so as to be a predetermined value, the battery voltage $V_b$ can be also controlled so as to be a predetermined value. In a case where the battery 301 has been insufficiently charged, the initial voltage $V_0$ of the battery 301 may be lower than a state where the battery 301 has been sufficiently charged. For example, degradation of the battery 301 over time increases the internal resistance $R_b$ of the battery 301. Therefore, the battery voltage $V_b$ may decrease when the battery current $I_b$ flows. In the case where the battery 301 has been insufficiently charged or in the case where the battery 301 has degraded, even when the same battery current $I_b$ flows, the battery voltage $V_b$ decreases. Thus, there is a risk that the battery voltage $V_b$ falls below an allowable battery voltage, for example, an operating voltage necessary for operating electrical equipment in accordance with electric power supply from the battery 301.

Figure 4A:
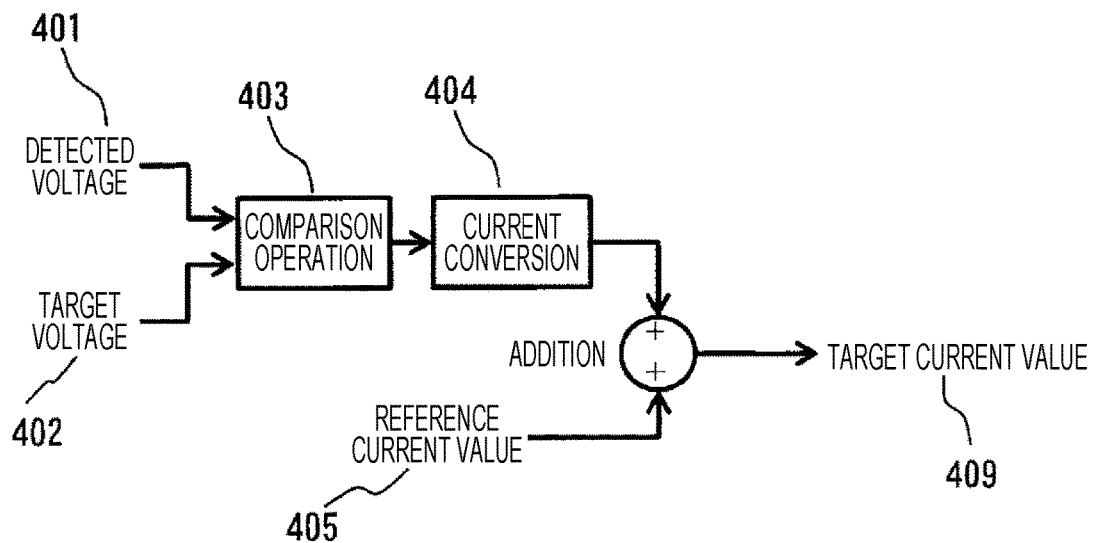
FIGS. 4A and 4B are diagrams illustrating methods for determining a target current value of a motor current and an electrification rate of the motor, respectively.
Figure 4B:
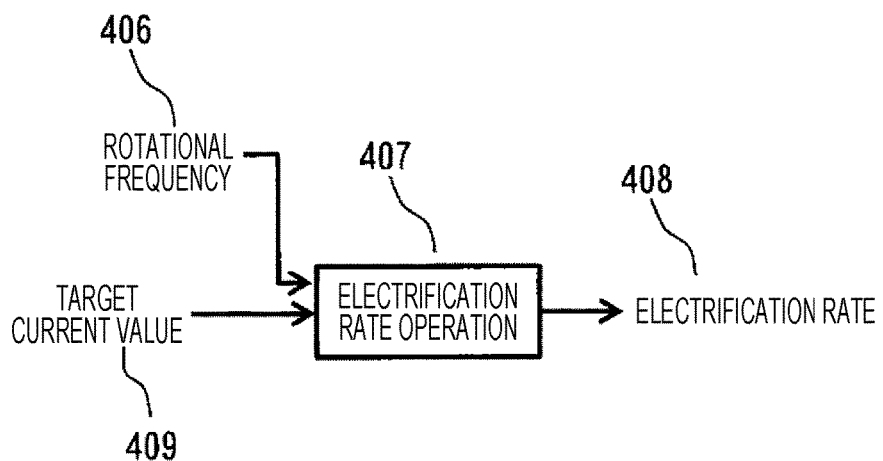

FIGS. 4(a) and 4(b) are diagrams illustrating methods for calculating a target current value of the motor current to be described later and the electrification rate of the motor in the PWM control that has been described above, respectively.

The control device 109 performs these calculations. The control device 109 acquires the battery voltage $V_b$ detected by, for example, a battery voltage detecting device (not illustrated), namely, a detected voltage 401 from, for example, the battery voltage detecting device. As illustrated in FIG. 4(a), the control device 109 compares the detected voltage 401 that has been acquired and a target voltage 402 that has been previously set, by a comparison operation 403. The target voltage 402 is previously determined based on, for example, a minimal operating voltage of, for example, the electrical equipment, and is stored in the control device 109.

Upon a comparison between the detected, voltage 401 and the target voltage 402, the control device 109 calculates a voltage value difference between the voltages. A current conversion 404 converts the voltage value difference into a current using a constant that has been previously determined, and adds the current proportional to the voltage value difference to a reference current value 405. When the voltage value difference is a negative value, the current proportional to the voltage value difference is subtracted from the reference current value 405. The above calculation determines a target current value 409 of the battery current $I_b$ to be supplied to the motor 105 of the starter 101. That is, the so-called feedback control controls the battery current $I_b$ to be supplied from the battery 301 to the motor 105 so as to cause the battery voltage to come close to the target voltage 402. A method, for increasing and decreasing a current in proportion to a voltage difference, is referred to as the so-called proportional control. A method referred to as the so-called PID control for controlling a current based on a voltage difference and a differential value or based on the voltage difference and an integral value, may be applied.

The constant that has been previously determined, used upon the conversion of the voltage value difference into the current, is a feedback gain determined by experiment. As the feedback gain decreases, convergence delays. Upon the conversion of the voltage value difference into the current, instead of using the constant that has been previously determined, a conversion table that has been previously determined may be used. When the voltage value difference is zero, the reference current value 405 is previously set so as to prevent the battery voltage $V_b$ from falling below the minimal operating voltage of, for example, the electrical equipment due to a voltage drop of the battery 301. The voltage drop of the battery 301 is caused by supplying the motor current $I_m$ (corresponding to the battery current $I_b$) that indicates a current value equivalent to the target current value 409, from the battery 301 to the motor 105. The control device 109 stores the above reference current value 405 that has been previously set, In a case where the current proportional to the voltage value difference is added to the reference current value 405, since the target current value 409 of the battery current $I_b$ increases, an engine can promptly start up in accordance with the increase. In a case where the current proportional to the voltage value difference is subtracted from the reference current value 405, although the engine start-up takes time, the battery voltage $V_b$ having magnitude that is not less than the minimal operating voltage of, for example, the electrical equipment, can be secured.

The control device 109 acquires the motor rotational frequency of the motor 105 from the motor rotation detecting sensor 110. Based on the above motor rotational frequency that has been acquired and the detected voltage 401, the control device 109 controls the switching element 107 so as to cause the current value of the motor current $I_m$ (corresponding to the battery current $I_b$) to come close to the target current value 409. That is, as illustrated in FIG. 4(b), with respect to the target current value 409, an electrification rate operation 407 using information on the motor rotational frequency, determines the electrification rate to be output. The electrification rate operation 407 will be described in detail using FIG. 3.

The battery voltage $V_b$ [V] can be represented by the following expression (3) using a motor resistance $R_m$ including, for example, a wiring resistance, an internal resistance inside the motor, and a resistance of the switching element, the battery current $I_b$ (motor current $I_m$) [A], a counter electromotive voltage $V_e$ [V] caused by motor rotation, or a counter electromotive voltage coefficient $k_e$ [V/rpm] of the motor 105, and the motor rotational frequency of the motor 105 $N_m$ [rpm] in the motor unit 101 in FIG. 3.

[Mathematical Formula 3]

$$V_b = I_b \times R_m + V_e \\ = I_b \times R_m + k_e \times N_m \qquad (3)$$

Here, the following expression 4 is acquired by expressions (2) and (3).

[Mathematical Formula 4]

$$V_0 - I_b \times R_b = I_b \times R_m + k_e \times N_m \qquad (4)$$
$$I_b = \frac{V_0 - k_e \times N_m}{R_m + R_b}$$

As shown in expression 4, in a direct-current motor, when the motor rotational frequency $N_m$ is zero, namely, the flow of the current becomes maximal at the beginning of the electrification. As the rotational frequency increases, the current decreases.

Expression (4) takes no account of the PWM control of the control device 109 through the switching element 107. That is, expression (4) corresponds to a state in which the electrification continues with respect to the motor 105. According to a study of inventors of the present invention, it was discovered that the current can be approximated by the following expression (5) with respect to the electrification rate D in the PWM control. With expression (5), changing the electrification rate D of the PWM control can control to cause the current to be constant.

[Mathematical Formula 5]

$$I_b = \frac{V_0 - k_e \times N_m}{R_m + R_b} \times D^2 \qquad (5)$$

As shown in expression (5), according to the present embodiment, the current $I_b$ that flows through the battery in the PWM control, is proportional to the square of the electrification rate D. In the configuration illustrated in FIG. 3, since the motor current $I_m$ that flows through the motor 105 of the starter 101 is equivalent to the battery current $I_b$, the motor current $I_m$ can be approximated so as to be proportional to the square of the electrification rate D when the PWM control is performed to the electrification to the direct-current motor 105. The approximation has been theoretically determined based on an experimental observation in the study of the inventers of the present invention. However, expression (5) is the approximation that satisfies only in a range in which one cycle of the PWM is sufficiently faster than the electrical time constant of the motor. Expression (5) indicates that the battery current $I_b$ is determined by constants and two variables including the motor rotational frequency $N_m$ and the electrification rate D. The approximation is reversely used and expression (5) is rearranged to the following expression (6) so that the electrification rate D is determined in order to acquire the predetermined battery current $I_b$.

[Mathematical Formula 6]

$$D = \sqrt{\frac{I_b \times (R_m + R_b)}{V_0 - k_e \times N_m}} \qquad (6)$$

According to the present embodiment, in expression (6), the battery current $I_b$ is set to be the target current value 409 and the electrification rate D is determined with the motor rotational frequency $N_m$. However, in a case where the electrification rate D calculated by expression (6) is more than 1.0, the electrification rate D is set to be 1.0.

Figure 5:
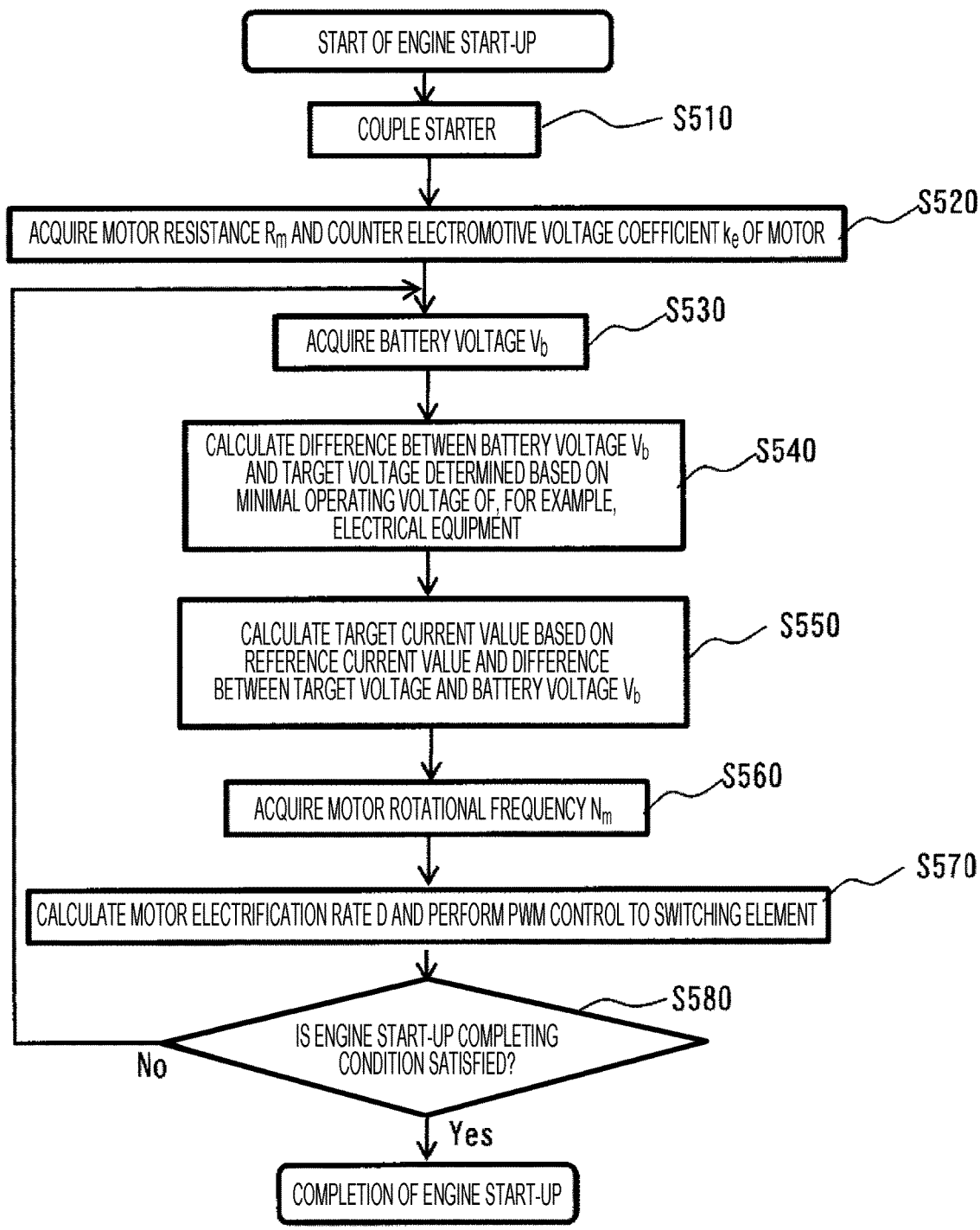
FIG. 5 is a flow chart illustrating contents in an engine start-up control method.

FIG. 5 is a flow chart illustrating contents in an engine-start-up control method performed by the control device 109 in the engine start-up device 100 according to the present embodiment. As illustrated in FIG. 5, when an engine start-up request occurs, the control device 109 illustrated in FIG. 1 couples the starter 101 and the engine (not illustrated) at step S510. In a case of a pinion extrusion method, the pinion gear 103 illustrated in FIG. 1 is extruded so as to engage with the ring gear 104 directly coupled to the engine. In a case that an idling stop method in which the starter 101 and the engine have coupled with each other, is applied, the starter 101 and the engine have already coupled with each other when a start-up request occurs during the idling stop. In that case, there is no need for performing processing at step S510.

At step S520, the control device 109 acquires the counter electromotive voltage coefficient $k_e$ of the motor and the motor resistance $R_m$ that have been previously stored. At step S530, the control device 109 acquires the battery voltage $V_b$ that has been detected by, for example, the battery voltage detecting device not illustrated. At step S540, the control device 109 calculates a difference between the battery voltage $V_b$ and the target voltage 402 determined based on the minimal operating voltage of, for example, the electrical equipment. At step S550, the control device 109 calculates the target current value 409 by following the procedure illustrated in FIG. 4(a) based on the difference between the target voltage 402 and the battery voltage $V_b$, and the reference current value 405 that has been previously stored. At step S560, the control device 109 acquires the motor rotational frequency $N_m$ from the motor rotation detecting sensor 110.

At step S570, the control device 109 uses the constants and the variable acquired at each of the processing steps from step S520 to step S560, calculates the electrification rate D of the PWM control by expression (6), outputs a waveform signal of the PWM control to the switching element 107, and controls the switching element 107. The PWM control with respect to the switching element 107 by the control device 109 causes the current to begin to flow through the motor 105. Torque of the motor 105 is transmitted to the engine so that the engine begins to rotate.

The control device 109 continues the series of processing from step 530 to step S570 until an engine start-up completing condition illustrated at step S580 is satisfied. The engine start-up completing condition at step S580 is, for example, that the engine rotation becomes a predetermined rotational frequency or more. When, the above completing condition is satisfied, it can be determined that the engine start-up has been completed. Until the completion of the engine start-up, the control device 109 detects the battery voltage $V_b$ and the motor rotational frequency $N_m$ at an equal interval (for example, at an interval of 2 ms) and calculates the electrification rate D so as to update output. Accordingly, the battery current remains constant from the start of the motor electrification to the completion of the engine start-up, and becomes the current value that has been set. Therefore, the battery voltage $V_b$ becomes also substantially constant, and is inhibited so as to be in the allowable range and close to the allowable value.

Modifications (1) Since the starter 101 and engine have coupled to each other in order to transmit the rotary force of the motor 105 to the engine until the engine start-up is completed, the motor rotational frequency $N_m$ can be also indirectly acquired from an engine rotational frequency.

At step S510 and after in FIG. 5, namely, when the motor 105 of the starter 101 and the engine (not illustrated) have coupled to each other, the motor rotational frequency $N_m$ of the motor can be indirectly calculated from the engine rotational frequency of the engine. As illustrated in FIG. 1, a large number of motor vehicles are equipped with the engine rotation detecting sensor 112 for detecting an engine rotational frequency. A rotational frequency of the motor 105 of the starter 101 is indirectly calculated from the engine rotational frequency that has been detected. Therefore, there is no need for equipping the motor rotation detecting sensor 110, resulting in cost reduction. Upon a calculation of the motor rotational frequency $N_m$ [rpm] of the motor 105 using the engine rotational frequency $N_e$ [rpm] and a rotational frequency conversion coefficient g, for example, expression (7) can be used.

[Mathematical Formula 7]

$$N_m \times N_e \times g \qquad (7)$$

The rotational frequency conversion coefficient g in expression (7) can be acquired by using a gear ratio between the engine and the motor 105. More specifically, in a case where the motor 105 and the engine couple to each other through the pinion gear 103 and the ring gear 104, the rotational frequency conversion coefficient g can be acquired by using the gear ratio that is determined by the number of teeth of the pinion gear 103 and the number of teeth of the ring gear 104. In a case where a deceleration mechanism is disposed between the motor 105 and the pinion gear 103 inside the starter 101, the rotational frequency conversion coefficient g can be acquired by using a deceleration ratio of the deceleration mechanism and the gear ratio. The rotational frequency conversion coefficient g is previously stored in the control device 109. The engine rotational frequency $N_e$ that has been detected is converted into the motor rotational frequency $N_m$ inside the control device 109.

(2) Typical starters have a configuration in which a one-way clutch is disposed between a motor and an engine. The motor transmits rotary force to the engine. The rotary force is transmitted only from the side of the starter. Since the clutch is disconnected when the engine starts combustion and an engine rotational frequency becomes larger than rotation of the starter, at this time a starter rotational frequency calculated from the engine rotational frequency does not correspond to the actual starter rotational frequency.

In a case where a motor rotational frequency is indirectly acquired by a calculation with the engine rotational frequency, a method for inferring the motor rotational frequency when a deviation between the calculated value and an actual motor rotational frequency occurs, will be described. The typical starters 101 have a configuration in which the one-way clutch 108 is disposed between the motor 105 and the engine (not illustrated). The motor 105 transmits rotary force to the engine. The rotary force is transmitted only from the side of the starter 101. That is, the rotary force of the motor 105 can rotate the engine. However, since the engine does not rotate the motor 105, the motor rotational frequency indirectly acquired by the calculation with the engine rotational frequency sometimes indicates a value higher than the actual motor rotational frequency. In that case, the motor rotational frequency is inferred.

Figure 6:
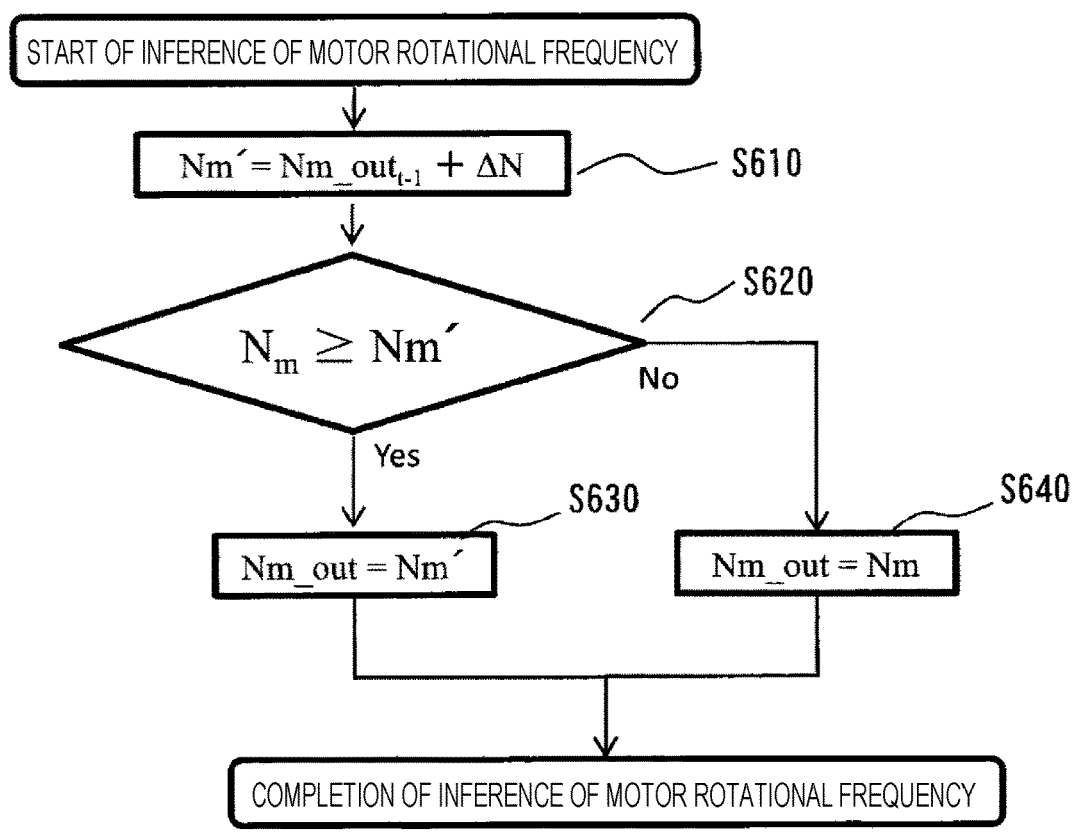
FIG. 6 is a flow chart illustrating a procedure for inferring a motor rotational frequency.

FIG. 6 is a flow chart illustrating a procedure for inferring the rotational frequency of the motor 105. Assuming that the motor 105 that has been disconnected to the clutch and has been in an unloaded condition upon a rapid increase of the engine rotational frequency due to the combustion, increases the rotational frequency with a constant slope. With the assumption, an upper limit is set to an increase of the rotational frequency every control cycle with respect to the motor rotational frequency that has been indirectly acquired. Accordingly, the motor rotational frequency is inferred with respect to the rapid increase of the engine rotation.

With respect, to the motor rotational frequency $N_m$ that has been indirectly acquired based on the engine rotational frequency $N_e$ detected by the engine rotation detecting sensor 112, the electrification rate D is calculated using; an inferred motor rotational frequency Nm_out inferred in consideration of possibility of a deviation between the motor rotational frequency $N_m$ and the actual motor rotational frequency. The calculation is repeated every control cycle. As $Nm\_out_{t-1}$, a calculated result before one control cycle is stored inside the control device. As the upper limit of the increase of the motor rotational frequency every control cycle, an upper limit value ΔN is previously set.

At step S610, the control device 109 illustrated in FIG. 1 adds the upper limit value ΔN to the inferred motor rotational frequency $Nm\_out_{t-1}$ and sets an inferred motor rotational frequency that has been newly inferred, as Nm'. The inferred motor rotational frequency Nm' that has been newly inferred is considered to be a maximal value that may increase in one control cycle with respect to the inferred motor rotational frequency $Nm\_out_{t-1}$ before one cycle.

At step S620, the control device 109 compares the motor rotational frequency $N_m$ that has been indirectly acquired and the inferred motor rotational frequency Nm' so as to determine whether the deviation from the actual motor rotational frequency has occurred. At step S620, the control device 109 determines that there is not deviation between the motor rotational frequency that has been indirectly acquired and the actual motor rotational frequency in a case where $N_m \geq Nm'$ has been negatively determined. At step S640, the control device 109 substitutes the motor rotational frequency $N_m$ that has been indirectly acquired as it is for the inferred motor rotational frequency Nm_out so as to use the inferred motor rotational frequency Nm_out in order to calculate the electrification rate D.

As step S620, the control device 109 determines that there is the deviation between the motor rotational frequency that has been indirectly acquired and the actual motor rotational frequency in a case where $N_m \geq Nm'$ has been positively determined. In that case, at step S630, the control device 109 substitutes the inferred motor rotational frequency Nm' for the inferred motor rotational frequency Nm_out so as to use the inferred motor rotational frequency Nm_out in order to calculate the electrification rate D. Accordingly, in a case where the motor rotational frequency has been indirectly acquired by the calculation with the engine rotational frequency, even when the deviation from the actual motor rotational frequency occurs, the electrification rate D can be correctly calculated.

Figure 7:
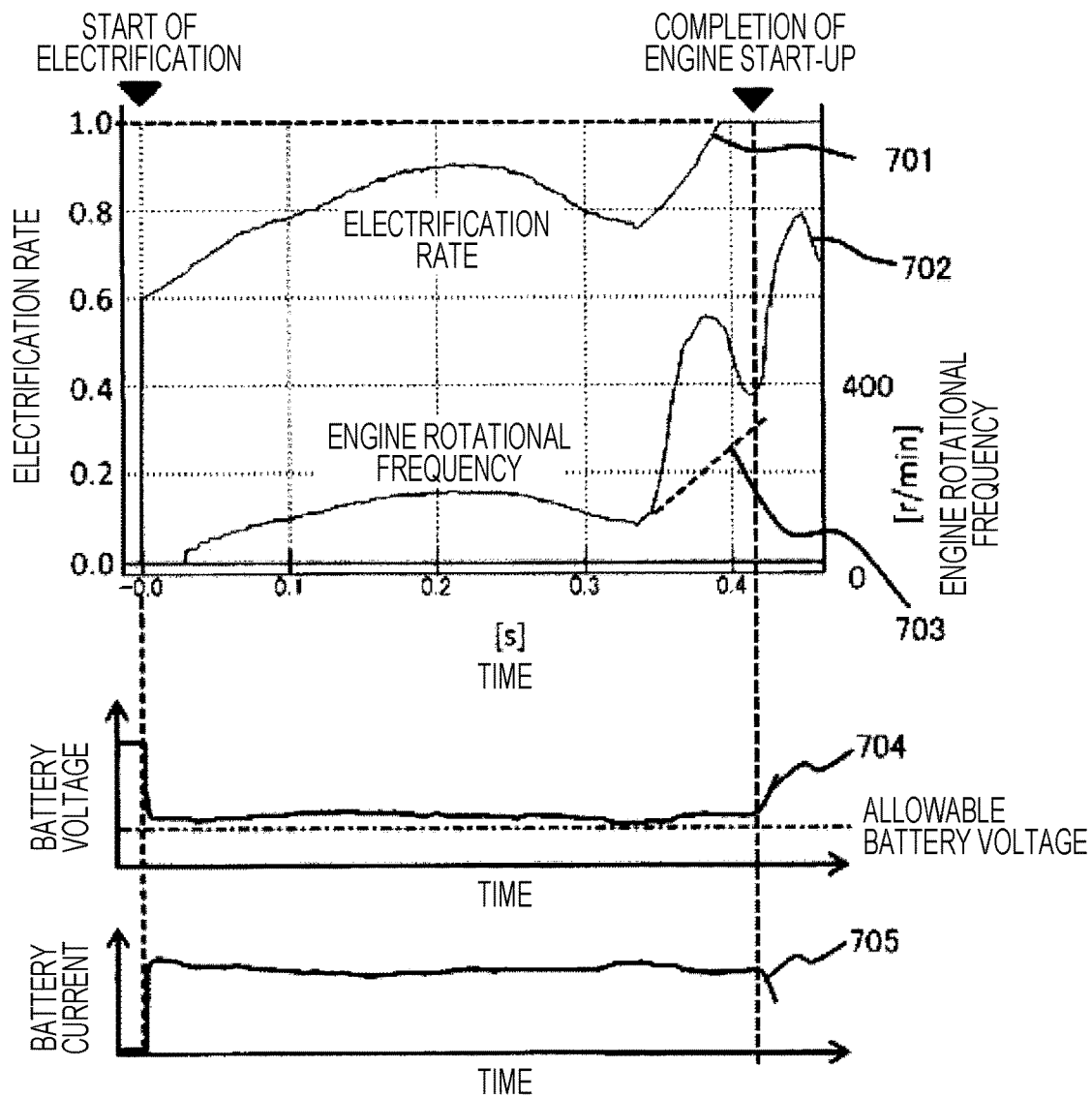
FIG. 7 illustrates exemplary waveform charts of engine start-up control as a function of time.

FIG. 7 illustrates exemplary waveform charts of the engine start-up control as a function of time. The engine rotational frequency, the electrification rate D output from the control device 109, the battery voltage, and the battery current as a function of time are illustrated so as to correspond to each other.

In the example illustrated in FIG. 7, the electrification rate has been calculated by using only the engine rotational frequency. The motor rotational frequency has been indirectly acquired by the calculation with the engine rotational, frequency. Therefore, the control device 109 performs an inference of the motor rotational frequency, taking the deviation between the actual motor rotational frequency and the motor rotational frequency that has been inferred into account. A value converted from the motor rotational frequency that has been inferred by the control device 109 as described above into a rotational frequency on an engine shaft based on the gear ratio between the motor and the engine, is denoted with a dotted line 703. As illustrated in FIG. 7, during the electrification, the battery current 705 remains substantially stable and constant from the beginning of the electrification. The battery current 705 is similar to a target current value of the battery current (motor current) that has been set. Similarly, as illustrated in FIG. 7, it; can be seen that, during the electrification, the battery voltage 704 remains stable and has restarted up the engine without falling below an allowable minimal voltage. In a case where the battery has degraded, similarly, it is confirmed that the battery has started up the engine without falling below the allowable minimal voltage.

Figure 8:
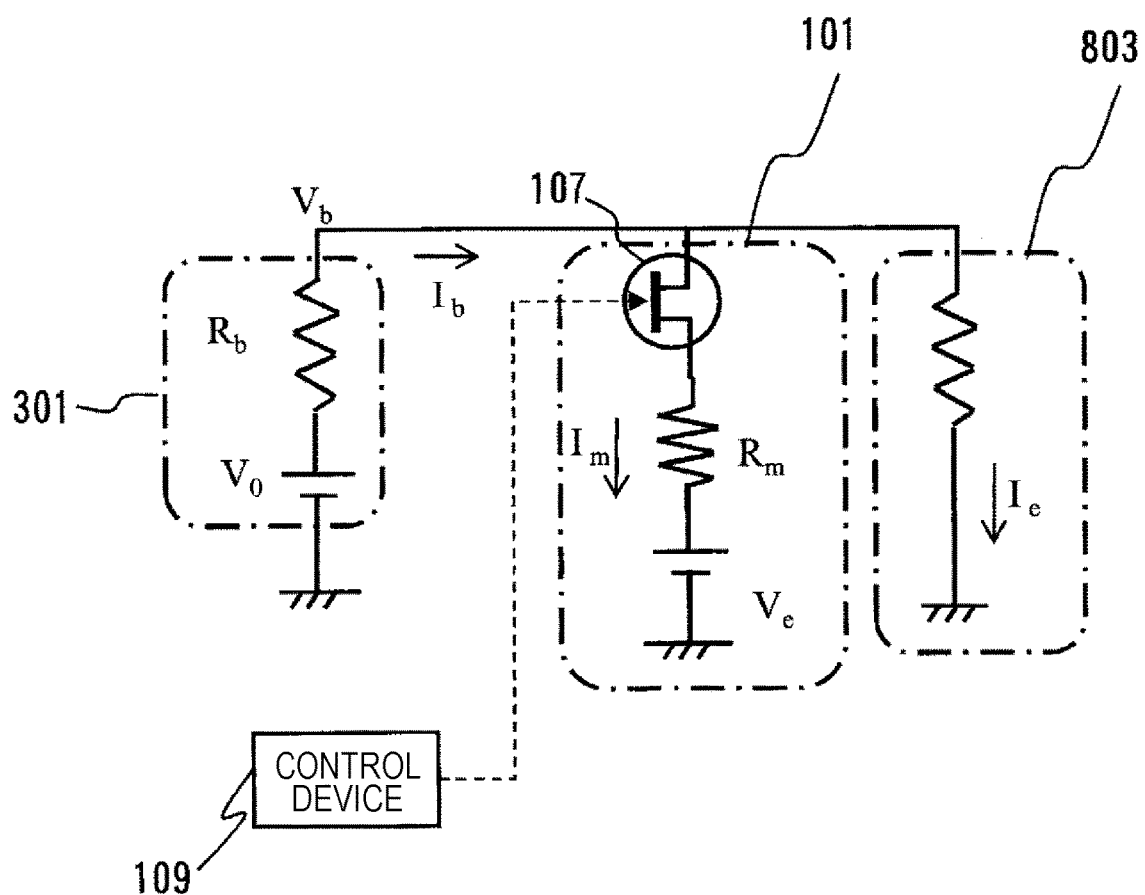
FIG. 8 is a simple circuit diagram illustrating the battery, the starter, and a different electrical apparatus other than the engine start-up device.

(3) Another method for determining the electrification rate D, will be described. FIG. 8 is a simple circuit diagram illustrating the starter 101, the battery 301, and a different electrical apparatus 803 other than the motor 105 of the starter 101. Electric power from the battery 301 is supplied not only to the motor 105 of the starter 101 but also to the different electrical apparatus 803. A method for appropriately changing the motor current to be supplied to the motor 105 so as to meet electric power demand of the electrical apparatus other than the motor 105 of the starter 101, will be described. In the simple circuit diagram illustrated in FIG. 3, the battery current that flows from the battery mostly flows through the motor as the motor current. However, in an actual vehicle, there is the different, electrical apparatus 803 through which the current flows other than the motor 105 of the starter 101.

The following expression (8) is satisfied between the battery current $I_m$ that flows through the battery 301, the current $I_m$ that is supplied from the battery 301 to the motor 105 of the starter 101 and flows through the motor 105, a total supplied current $I_e$ that is supplied from the battery 301 to the different electrical apparatus 803 other than the motor 105 and flows through the different electrical apparatus 803.

$$I_b = I_m + I_e$$

$$I_m = I_b - I_e \qquad \text{[Mathematical Formula 8]}$$

As shown in expression (8), the battery current $I_b$ is the sum of the motor current and the supplied current $I_e$ that flows through the different electrical apparatus other than the motor. The battery current $I_b$ need to have a current value that is an allowable battery current or more so as to prevent the battery voltage $V_b$ from falling below the minimal operating voltage of, for example, the electrical equipment due to the voltage drop of the battery 301. A current value obtained by subtracting the supplied current $I_e$ of the different electrical apparatus 803 other than the motor 105 from the allowable battery current value, is set to be an upper limit value of the motor current $I_m$. Thus, there is arranged a configuration in which the battery current $I_b$ entirely remains constant so as to be the allowable battery current value. There is arranged a configuration in which the supplied current $I_e$ that flows through the different electrical apparatus 803 other than the motor 105 is directly or indirectly acquired. For example, a current sensor directly measures the supplied current $I_e$ that flows through the different electrical apparatus 803 other than the motor 105. The control device 109 acquires the measured value from the current sensor. Currents normally used by a plurality of electrical apparatuses included in the different electrical apparatus 803 are individually previously stored in the control device 109. In a case where the plurality of electrical apparatuses has been used, assuming that the currents that have been stored flow, the control device 109 indirectly calculates the current value of the supplied current that flows through the electrical apparatus 803 other than the motor 105. As described above, the control device 109 acquires the supplied current $I_e$ of the different electrical apparatus 803 other than the motor 105. Therefore, a target current value of the motor current $I_m$ to be supplied to the motor 105 in order to cause the battery current $I_b$ to remain constant so as to be the allowable battery current value, can be calculated. The control device 109 calculates the electrification rate D to the motor 105 using the following expression (9).

[Mathematical Formula 9]

$$D = \sqrt{\frac{I_m \times (R_m + R_b)}{V_0 - k_e \times N_m}} \qquad (9)$$

Even when the supplied current $I_e$ that flows through the different electrical apparatus 803 other than the motor 105 varies, the target current value of the motor current $I_m$ that flows through the motor 105 is determined using expression (8) and the electrification rate D to the motor 105 is calculated using expression (9). Thus, the battery current $I_b$ can remain constant. Therefore, the engine can maximally swiftly start up while the voltage drop of the battery 301 is inhibited in an allowable range.

(4) In the engine start-up device 100 according to the above embodiment or the modifications, the control device 109 directly or indirectly acquires the motor rotational frequency $N_m$ of the motor 105. However, when the engine start-up device 100 is manufactured, the motor rotational frequency $N_m$ of the motor 105 when the engine starts up, may be modeled and stored in the control device 109. When the engine actually starts up, the control device 109 specifies an appropriate model, selects and acquires a motor rotational frequency $N_m$ that corresponds to the specified appropriate model, from the motor rotational frequencies $N_m$ of the motor 105, the motor rotational frequencies $N_m$ having been stored.

(5) In the engine start-up device 100 according to the above embodiment or the modifications, the control device 109 controls the switching element 107 that has been coupled to the motor 105 and through which the motor current $I_m$ flows, so as to cause the motor-current value of the motor current $I_m$ to come close to the target current value 409. However, as a circuit element instead of the switching element 107, a variable resistance may be disposed inside the starter 101. The control device 109 controls the variable resistance that has been coupled to the motor 105 and through which the motor current $I_m$ flows, and adjusts a resistance value of the variable resistance so as to cause the motor-current value of the motor current $I_m$ to come close to the target current, value 409.

The engine start-up device 100 according to the above embodiment or the modifications, is the engine start-up device 101 that starts up the engine by transmitting the rotary force of the motor 105 driven by the battery 301 to the engine, and includes the device 109. The control device 109 acquires the battery voltage $V_b$ of the battery 301. Based on the battery voltage $V_b$ that has been acquired, the control device 109 calculates the target current value 409 of the motor current $I_m$ to be supplied from the battery 301 to the motor 105. The control device 109 controls the switching element 107 or the circuit element, such as the variable resistance, that has been coupled to the motor 105 and through which the motor current $I_m$ flows so as to cause the motor-current value of the motor current $I_m$ to come close to the target current value 409. In the above engine start-up device 100, the following effect can be acquired. That is, from the start of the motor electrification to the completion of the engine start-up, the motor current $I_m$ is controlled so as to cause the battery current $I_b$ to retain a substantially constant arbitrary value. Therefore, the battery voltage $V_b$ can also remain substantially constant. In particular, since the target current value of the motor current $I_m$ is recalculated each time the battery voltage $V_b$ is repeatedly acquired, the motor current $I_m$ can be adjusted in accordance with a state change of the battery 301, such as occurrence of a rapid voltage drop. As described above, even when the state of the battery varies, the battery voltage drop can be inhibited in the allowable range. When the engine starts up, the battery voltage $V_b$ can be prevented from falling below the allowable value (minimal operating voltage of, for example, the electrical equipment). The engine can maximally swiftly start up while retaining the state.

In a case where the switching element 107 is used as the above circuit element, the control device 109 determines the electrification rate D of the PWM control to the motor 105 based on the motor rotational frequency $N_m$. The control device 109 outputs a PWM control signal that varies the electrification rate D, with respect to the switching element 107 so that the switching element 107 can vary the motor current $I_m$.

According to each of the modifications (1) and (2), the control device 109 acquires indirectly the motor rotational frequency $N_m$ by the calculation with the engine rotational frequency $N_e$. In this case, there is no need for installing the motor rotation detecting sensor 110 for detecting the rotation of the motor 105, in the starter 101, resulting in cost reduction.

According to the modification (3), the control device 109 acquires the current $I_e$ that flows through the different electrical apparatus 803 other than the motor 105, the different electrical apparatus 803 using the battery 301, as the power supply, shared with the motor 105. In a case where the circuit element through which the motor current $I_m$ flows is controlled so as to cause the battery current $I_b$ to be entirely constant, even when a large current flows through the different electrical apparatus 803 other than the motor 105, the voltage drop of the battery 301 can be inhibited in the allowable range.

REFERENCE SIGNS LIST 100 engine start-up device
101 starter
102 magnet switch
103 pinion gear
104 ring gear
105 motor
106 switch
107 switching element
108 one-way clutch
109 control device
110 motor rotation detecting sensor
111 lever
112 engine rotation detecting sensor
301 battery

The invention claimed is:

1. An engine start-up device that starts up an engine by transmitting rotary force of a direct-current motor driven by a battery to the engine, comprising:
  a battery-voltage acquisition unit configured to acquire a battery voltage of the battery;
  a target-current-value calculation unit configured to calculate a target current value of a motor current to be supplied from the battery to the direct-current motor, based on the battery voltage acquired by the battery-voltage acquisition unit; and
  a motor-current control unit configured to control a circuit element that has been coupled to the direct-current motor and through which the motor current flows so as to cause a motor-current value of the motor current to come close to the target current value.

2. The engine start-up device according to claim 1, further comprising a motor-rotational-frequency acquisition unit configured to acquire a motor rotational frequency of the direct-current motor,
  wherein the motor-current control unit controls the circuit element so as to cause the motor-current value to come close to the target current value, based on the battery voltage acquired by the battery-voltage acquisition unit and the motor rotational frequency acquired by the motor-rotational-frequency acquisition unit.

3. The engine start-up device according to claim 2,
  wherein the motor-current control unit stores a reference current value of the target current value and a target voltage determined based on an operating voltage necessary for operating a different electrical apparatus other than the direct-current motor in accordance with electric power supply from the battery,
  the target-current-value calculation unit calculates the target current value based on the reference current value stored in the motor-current control unit and a voltage difference between the battery voltage acquired by the battery-voltage acquisition unit and the target voltage, and
  the reference current value stored in the motor-current control unit is previously set so as to prevent the battery voltage from falling below the operating voltage due to a voltage drop of the battery caused by supplying the motor current that indicates a current value equivalent to the target current value, from the battery to the direct-current motor when the voltage difference is zero.

4. The engine start-up device according to claim 2,
  wherein the motor-current control unit controls the circuit element in accordance with an electrification rate denoted by a ratio between a time interval from a start of electrification to a completion of the electrification and a time interval from the start of the electrification to the start of the electrification again through the completion of the electrification so as to perform PWM control that repeats the start and completion of the electrification from the battery to the direct-current motor, and
  the motor-current control unit determines the electrification rate based on the battery voltage acquired by the battery-voltage acquisition unit, an internal resistance of the battery, the target current value calculated by the target-current-value calculation unit, the motor rotational frequency acquired by the motor-rotational-frequency acquisition unit, a motor resistance included in the direct-current motor, and a counter electromotive voltage coefficient of the direct-current motor.

5. The engine start-up device according to claim 4,
  wherein the motor-rotational-frequency acquisition unit acquires the motor rotational frequency from a motor-rotation detecting unit that detects the motor rotational frequency.

6. The engine start-up device according to claim 4,
  wherein the motor-rotational-frequency acquisition unit acquires an engine rotational frequency of the engine, and acquires the motor rotational frequency based on the engine rotational frequency.

7. The engine start-up device according to claim 3, further comprising a supplied-current acquisition unit configured to acquire a supplied current to be supplied from the battery to the different electrical apparatus,
  wherein the target-current-value calculation unit calculates the target current value based on the voltage difference between the target voltage and the battery voltage acquired by the battery-voltage acquisition unit, the reference current value stored in the motor-current control unit, and the supplied current acquired by the supplied-current acquisition unit.

8. An engine-start-up control method for controlling an engine start-up that starts up an engine by transmitting rotary force of a direct-current motor driven by a battery to the engine, comprising:
  acquiring a battery voltage of the battery;
  calculating a target current value of a motor current to be supplied from the battery to the direct-current motor based on the battery voltage; and
  controlling a circuit element that has been coupled to the direct-current motor and through which the motor current flows so as to cause a motor-current value of the motor current to come close to the target current value.

9. The engine-start-up control method according to claim 8, further comprising:
  calculating the target current value based on a reference current value of the target current value and a voltage difference between the battery voltage and a target voltage determined based on an operating voltage necessary for operating a different electrical apparatus other than the direct-current motor in accordance with electric power supply from the battery;

setting, previously, the reference current value so as to prevent the battery voltage from falling below the operating voltage due to a voltage drop of the battery caused by supplying the motor current that indicates a current value equivalent to the target current value, from the battery to the direct-current motor when the voltage difference is zero;

acquiring a motor rotational frequency of the direct-current motor; and controlling the circuit element based on the battery voltage and the motor rotational frequency when the circuit element is controlled so as to cause the motor-current value to come close to the target current value.

\* \* \* \* \*